July 1, 1958     J. P. CHAYKA     2,841,025

DRIVE MEANS FOR BROACHING MACHINES AND THE LIKE

Filed March 25, 1957     3 Sheets-Sheet 1

INVENTOR.
JOSEPH P. CHAYKA
BY
ATTORNEY

INVENTOR.
JOSEPH P. CHAYKA
BY
ATTORNEY 2,841,025

DRIVE MEANS FOR BROACHING MACHINES AND THE LIKE

Joseph P. Chayka, Rochester, Mich., assignor to Detroit Broach & Machine Company, Rochester, Mich., a corporation of Michigan Application March 25, 1957, Serial No. 648,093

2 Claims. (Cl. 74—409)

This invention relates to rack and pinion drive means for the main slide of broaching machines and the like, and in particular to means for adjusting and controlling the extent of backlash in such drives.

In rack and pinion drive assemblies for reciprocating slides such as the main broach or work carrying slide of broaching machines, once the machine is built to theoretical and practical tolerances, the backlash or take-up between the drive and driven elements is established, and to subsequently provide new and closer tolerances to reduce backlash to a minimum generally becomes a major tear-down and rebuild operation.

For example, the rack and pinion drive gearing of a broaching slide is usually built to the theoretical pitch line of the rack and pinion teeth. The actual construction of a machine precisely as designed is difficult to accomplish due to the many elements in a drive assembly which make it substantially impossible to locate the pinion with sufficient accuracy in respect to the rack to reduce the operating backlash to zero plus only a minute clearance required to prevent binding of the mating gear teeth of the rack and pinion.

With the foregoing in view, the primary object of the invention is to provide a drive means for broaching machine slides and the like which can be readily and effectively adjusted to control or eliminate as nearly as practicable the backlash in the drive.

A further object of the invention is to provide a rack and pinion drive means including an adjustable mounting for the pinion that permits the mating teeth of the rack and pinion to be built to a theoretical pitch line with normal manufacturing tolerances, the said drive means including simple, effective and inexpensive means to readily adjust the mating of the said rack and pinion gearing to minimum actual operating tolerances thereby to reduce manufacturing clearances and actual operating clearances in the drive means to substantially zero and thereby reduce backlash in the drive to an absolute minimum without binding of the mating elements thereof.

Other objects of the invention will become apparent by reference to the following detailed description taken in connection with the accompanying drawings, in which.

Figure 1:
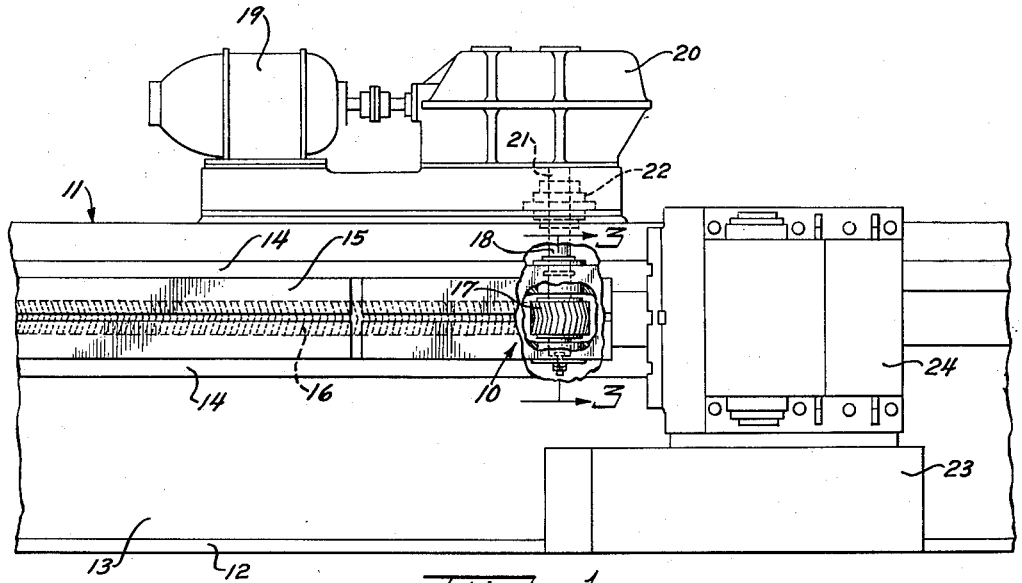
Fig. 1 is a side elevational view of a horizontal broaching machine incorporating a drive means embodying the invention.
Figure 2:
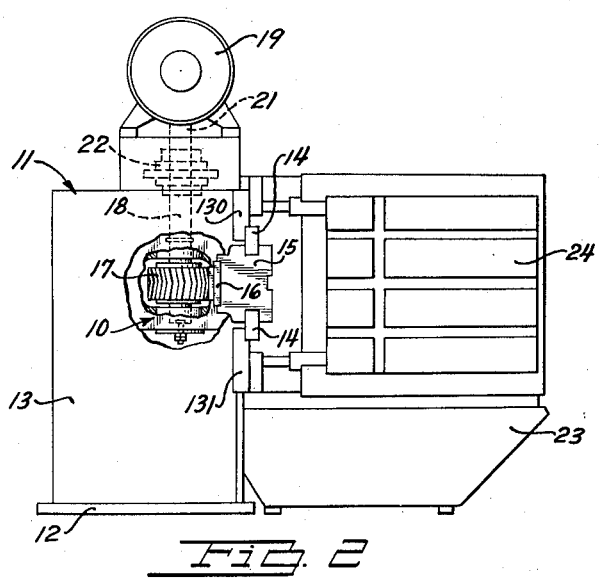
Fig. 2 is an end elevational view of the broaching machine shown in Fig. 1.

Referring now to the drawings wherein like numerals refer to like and corresponding parts throughout the several views, a drive means 10 embodying the invention is disclosed for illustrative purposes in connection with a horizontal broaching machine 11 consisting of a base 12, a frame 13 including ways 14 onto which is slidably mounted a broaching slide 15 having a rack 16 fixed thereto, and a drive means 10 having a pinion 17 meshed with the rack 16. The pinion 17 is keyed onto a pinion shaft 18 which is driven in opposite directions by an electric motor 19 through a speed reducer 20. The low speed shaft 21 of the speed reducer 20 is connected by means of a flexible coupling 22 to the pinion shaft 18. In the particular broaching machine 11 illustrated in Figs. 1 and 2, a knee mechanism generally designated by the numeral 23 is provided which includes a work carrying slide 24 arranged to carry work (not shown) into and out of broaching relationship with respect to a broach (not shown) carried by the broaching slide 15. The instant invention is directed to improvements in the drive means 10 for readily and effectively adjusting or taking-up unnecessary tolerances or play in the above described means for reciprocating the broaching slide, thus reducing backlash in the broaching slide to a minimum.

Figure 3:
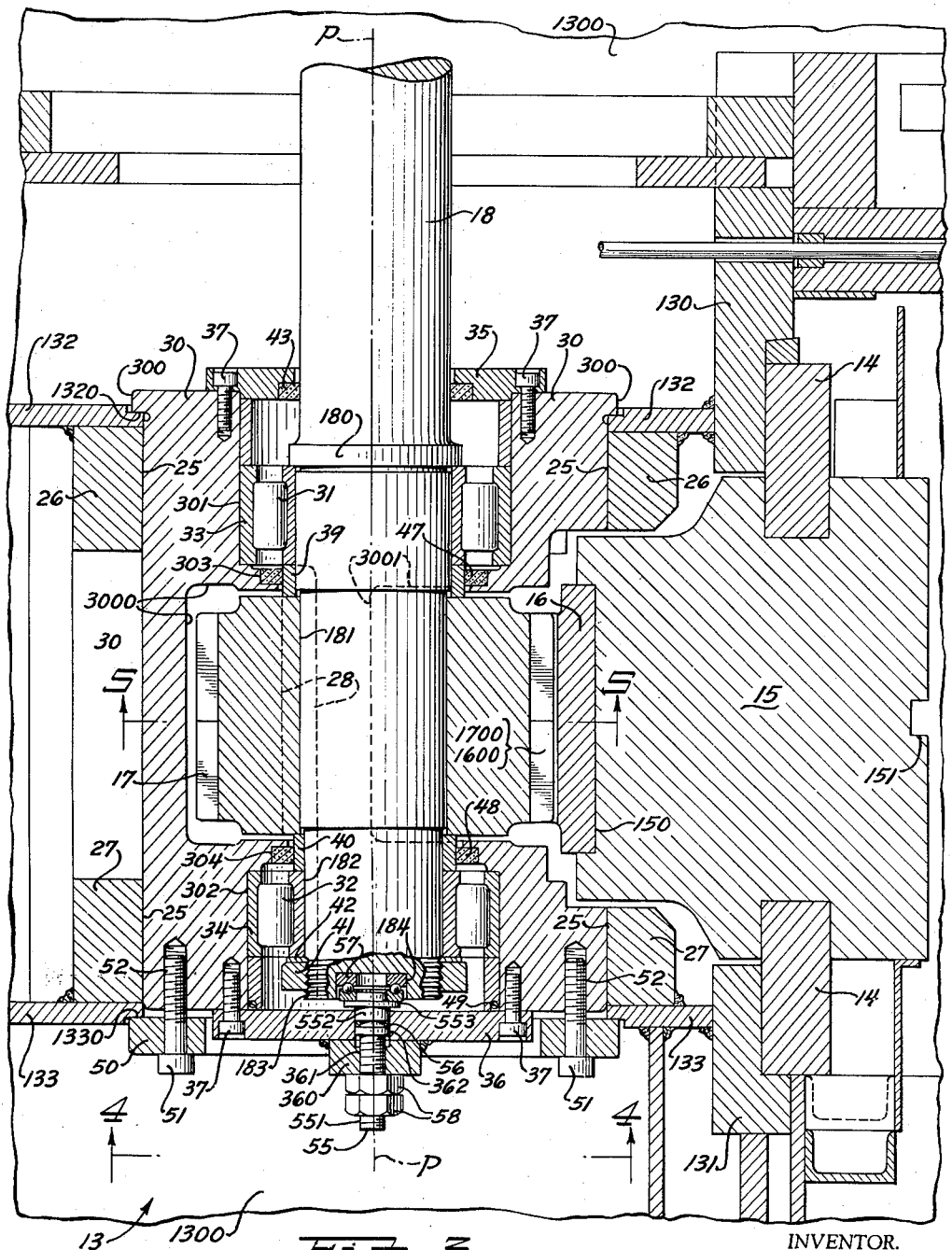
Fig. 3 is an enlarged fragmentary detailed sectional view of the drive means taken on the line 3—3 of Fig. 1.

As best shown in Fig. 3, the frame 13 of the broaching machine 11 is provided with a pair of longitudinally disposed front frame members 130 and 131 onto which the longitudinal ways 14 are mounted, the broaching slide 15 being slidably mounted on said ways. The rack 16 is preferably fixed to the rear of the slide 15 in a recess 150 provided therefor, the front of the said slide 15 being provided with a keyway 151 to receive and mount a broaching tool (not shown). Fixed to and extending rearwardly from the front frame members 130 and 131 are horizontally disposed frame members 132 and 133 spaced above and below the said slide 15 respectively. The said horizontally disposed frame members 132 and 133 are preferably supported rigidly on longitudinally spaced machine frame walls 1300. Each of said spaced horizontally disposed frame members 132 and 133 are backed up by collars 26 and 27 respectively, which collars are welded or otherwise secured to said frame members 132 and 133 respectively. The said frame members 132 and 133 and their respective collars 26 and 27 are provided with a pinion housing bore 25 therethrough to turnably accommodate a pinion housing 30. The upper horizontal frame member 132 is provided with an upper annular seat 1320 around the said bore 25 therethrough, while the lower horizontal frame member 133 is provided with a lower annular seat 1330 around the said bore 25 therethrough.

The pinion housing 30 is cylindrically formed to fit snugly in concentric turnable relationship in the bore 25 through the said frame members 132 and 133 and their collars 26 and 27 respectively. The said pinion housing 30 is provided with a radially disposed flange 300 formed at the upper end thereof which registers with the upper annular seat 1320 of the upper horizontal frame member 132 by means of which the said pinion housing 30 is supported in turnable depending relationship on the said upper horizontal frame member 132.

The said pinion housing 30 is eccentrically bored to accommodate the pinion shaft 18 which is mounted on roller bearings 31 and 32 disposed in counterbores 301 and 302. The said pinion housing 30 is also eccentrically hollow formed at 3000 to accommodate the pinion 17 mounted on the pinion shaft 18, and is cut away at 3001 to permit the pinion 17 to extend therefrom and mesh with the rack 16. The outer races of the roller bearings 31 and 32 are fixed in counterbores 301 and 302 by means of spacers 33 and 34 and end plates 35 and 36 respectively. The said end plates 35 and 36 are secured to the upper and lower ends respectively of the pinion housing 30 by suitable studs 37. The pinion shaft 18 is preferably provided with a collar 180 integral therewith and located above the inner race of the upper roller bearing 31. The said pinion shaft 18 is reduced in diameter at 181 to receive the pinion 17 and again reduced in diameter at 182 to telescope into the inner race of the lower roller bearing 32. The pinion 17 is keyed on the reduced portion 181 of the pinion shaft 18 by means of a key 26 fitted into suitable keyways cut in the pinion 17 and the pinion shaft 18. Between the inner races of the roller bearings 31 and 32 and the pinion 17 are suitable spacers 39 and 40 which hold the inner races of the roller bearings 31 and 32 and the pinion 17 properly spaced when the said roller bearings 31 and 32, the pinion 17 and the spacers 39 and 40 are assembled on the pinion shaft 18 as shown in Fig. 3, and the securing nut 41 threaded on the lower, threaded end 183 of the pinion shaft 18 is tightened. A suitable lock washer 42 disposed between the securing nut 41 and the inner race of the lower roller bearing 32 prevents loosening of the said securing nut 41.

The upper end plate 35 on the pinion housing 30 is bored and counterbored to permit the pinion shaft 18 to extend therethrough and to accommodate a suitable oil seal 43 disposed around the said pinion shaft 18. Counterbores 303 and 304 are provided in the pinion housing 30 adjacent the bearing counterbores 301 and 302 respectively into which suitable oil seals 47 and 48 are positioned, which oil seals in annular surface contact with the spacers 39 and 40 on the pinion shaft 18. An O-ring 49 is disposed between the lower end of the spacer 40, the lower inner periphery of the pinion housing 30 and the lower end plate 36 to provide an oil tight joint therebetween. With the foregoing construction, a grease reservoir surrounds each of said roller bearings 31 and 32.

The pinion housing 30 is fixed against turning in the bore 25 through the upper horizontal frame member 132, its collar 26, the lower horizontal frame member 133 and its collar 27 by means of a securing ring 50. The said securing ring 50 is seated in the lower annular seat 1330 formed in the lower face of the lower horizontal frame member 133 around the bore 25 therethrough, and is secured to the lower annular end of the said pinion housing 30 by means of suitable studs 51 threaded into threaded bores 52 therein. The tightening of the said studs 51 pulls the upper flange 300 of the pinion housing 30 and the securing ring 50 into firm contact with the annular seats 1320 and 1330 of the horizontal frame members 132 and 133 respectively and fixes the said pinion housing 30 and the center of the pinion shaft 18 rotatably mounted therein in the desired adjusted relationship with respect to the rack 16 of the broaching slide 15 as hereinafter described.

Figure 4:
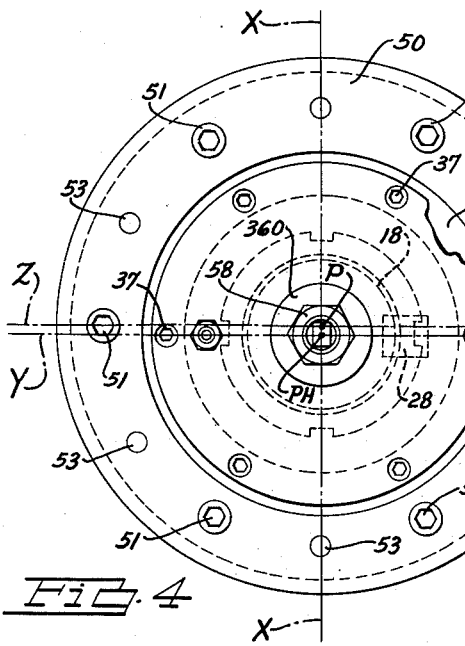
Fig. 4 is a bottom elevational view taken on the line 4—4 of Fig. 3.
Figure 5:
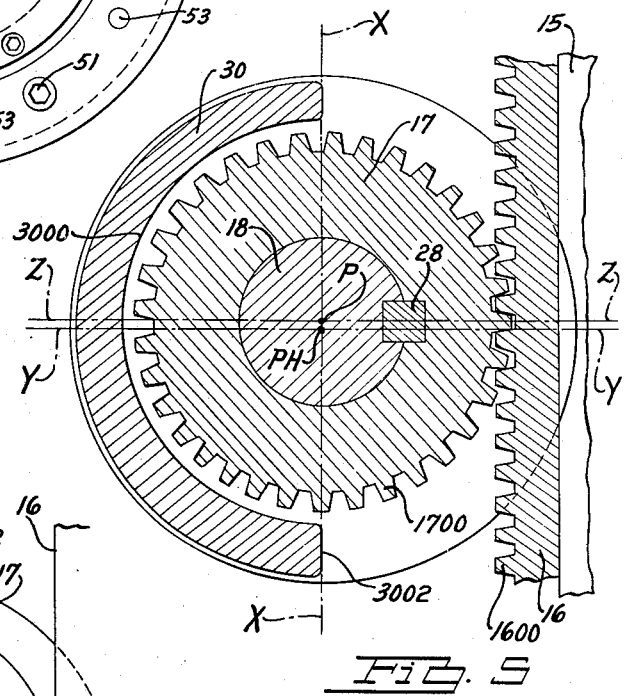
Fig. 5 is a sectional view taken on the line 5—5 of Fig. 3.
Figure 6:
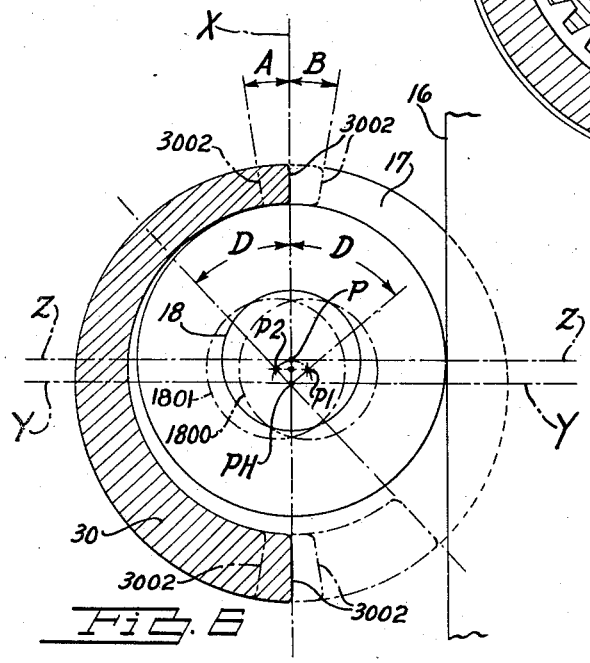
Fig. 6 is a diagrammatic view indicating the method of adjusting the main drive pinion in respect to the rack.

When the said studs 51 are loosened, the pinion housing 30 is readily turnable in the pinion housing bore 25 about its axial center PH located at the intersection of axes X—X and Y—Y thereof as best shown in Figs. 4, 5 and 6. The axis X—X of the pinion housing 30 is disposed parallel to the axis of travel of the broaching slide 15 and spaced therefrom. The axis Y—Y of the pinion housing 30 is disposed normal to the said axis X—X thereof. In its theoretical designed position, the axial center P of the pinion shaft 18 and pinion 17 is located at the intersection of the axes Z—Z and X—X thereof as best shown in Figs. 4, 5 and 6. The axis X—X of the pinion shaft 18 and pinion 17 is preferably located on the axis X—X of the pinion housing 30 while the axis Z—Z of the said pinion shaft 18 and pinion 17 is disposed normal to its axis X—X but spaced eccentric with respect to the axis Y—Y of the said pinion housing 30. With such an arrangement, the turning of the pinion housing 30 in opposite angular directions about its axial center line PH moves the axial center line P of the pinion shaft 18 and the pinion 17 mounted thereon arcuately about the said center line PH thereby moving the pinion teeth 1700 of pinion 17 into a greater or lesser meshing engagement with the rack teeth 1600 of the rack 16. Suitable wrench holes 53 may be provided in the securing ring 50 to permit the pinion housing 30 to which the said securing ring 50 is connected to be readily turned in the pinion housing bore 25.

The cut-away of the pinion housing 30 at 3001 is sufficient to permit the pinion housing 30 to be turned about its axis PH to move the pinion teeth 1700 into said greater or lesser meshing engagement with the said rack teeth 1600. As shown in Fig. 6, this turning of the pinion housing is limited to an angular distance D each side of the axis Y—Y of the pinion housing 30 which is sufficient to permit any necessary adjustment or readjustment of the meshing of the teeth 1600 and 1700 of the rack and pinion gearing 16—17 without the flat 3002 of the pinion housing 30 fouling the teeth 1600 of the rack 16.

The lower end plate 36 of the pinion housing 30 preferably has a cylindrical hub plate 360 welded centrally thereto, and the said end plate and hub plate 36—360 are bored and threaded at 361 and counterbored at 362 as shown in Fig. 3 to accommodate a pinion shaft adjusting pin 55. The said pinion shaft adjusting pin 55 is threaded at its lower end 551 into the said threaded bore 361 and slidably fits at its cylindrical upper portion 552 into the said counterbore 362. The upper cylindrical portion 552 of the pinion shaft adjusting pin 55 is suitably grooved to accommodate an O-ring type oil seal 56. The said pinion shaft adjusting pin 55 telescopes into the lower race of a thrust bearing 57 which is seated upon a radially extending circumferential flange 553 preferably formed integral with the said adjusting pin 55. The said circumferential flange 553 of the pinion adjusting pin 55 is located in spaced relationship above the top of the said lower end plate 36 of the pinion housing 30. The outer race of the thrust bearing 57 is positioned into an axial bore 184 provided in the lower end of the pinion shaft 18. A pair of lock nuts 58 are threaded on the lower threaded end 551 of the pinion shaft adjusting pin 55 to fix it and the pinion shaft 18 into any axial position to which they may be adjusted.

With the foregoing construction, the pinion shaft 18 and the pinion 17 keyed thereon is axially shiftable with respect to the broaching slide 15 and the rack 16 thereon so that when herringbone type rack and pinion gearing 16 and 17 is employed, it may be properly aligned. The thrust bearing 57 functions to rotatably support the pinion 17 of the rack and pinion gearing 16 and 17 in its properly aligned position to which it is adjusted in respect to the rack 16 by the said pinion shaft adjusting pin 55.

The procedure employed to set the proper backlash in the slide drive will now be described. First, loosen the securing ring studs 51 of the pinion housing securing ring 50. Then loosen the lock nuts 58 of the pinion shaft adjusting pin 55 and turn out the said adjusting pin 55 so that the radially extending circumferential flange 553 thereof is free from axially supporting the pinion shaft 18. Then turn the pinion housing 30 so that the teeth 1700 of the pinion 17 are in zero backlash relationship with respect to the teeth 1600 of the rack 16. Hand turn adjusting pin 55 to hold the pinion 17 on the center line of the rack 16, which position it automatically takes when teeth 1700 and 1600 of the herringbone type rack and pinion gearing 17—16 become mated in their zero backlash position. Now check the angular relationship of the pinion housing flat 3002 to the plane of the rack 16 on the broaching slide 15 which is read in terms of the angle A or B from the axis X—X of the pinion housing 30.

In a typical design, the following angular relationship chart indicates the number of degrees to turn the pinion housing 30 to obtain a preferred allowable amount of backlash in the drive.

| Degrees | Backlash | Degrees | Backlash |
|---------|----------|---------|----------|
| 1       | .00218   | 22      | .0467    |
| 2       | .00436   | 23      | .0488    |
| 3       | .00654   | 24      | .0508    |
| 4       | .00872   | 25      | .0528    |
| 5       | .01089   | 26      | .0547    |
| 6       | .01306   | 27      | .0567    |
| 7       | .01523   | 28      | .0586    |
| 8       | .01739   | 29      | .0606    |
| 9       | .0195    | 30      | .0625    |
| 10      | .0217    | 31      | .0643    |
| 11      | .0238    | 32      | .0661    |
| 12      | .0259    | 33      | .0680    |
| 13      | .0281    | 34      | .0698    |
| 14      | .0302    | 35      | .0716    |
| 15      | .0323    | 36      | .0734    |
| 16      | .0344    | 37      | .0752    |
| 17      | .0365    | 38      | .0769    |
| 18      | .0386    | 39      | .0786    |
| 19      | .0407    | 40      | .0803    |
| 20      | .0427    | 41      | .082     |
| 21      | .0447    | 42      | .0836    |

*Note.*—In the said typical design, the maximum permissible turning D of the pinion housing 30 in each direction from its axis X—X without danger of the pinion housing 30 fouling the rack 16 was 42 degrees. The dot and dash indications 1800 and 1801 in Fig. 6 show diagrammatically the relative position of the pinion shaft 18 when the center P of the pinion shaft 18 is shifted arcuately to P–1 or P–2 by the turning D of the pinion housing 30.

If, for example, the said angle A should be measured to be 11 degrees, from the foregoing table, the allowable backlash would be .0238 inch. Assuming, for the particular gearing employed, that the proper backlash is .009 inch minimum, .0115 inch average, and .014 inch maximum, then, if an average backlash adjustment is desired, .0115 inch would be added to the .0238 inch, which would give a figure of .0353 inch. Referring again to the table, and interpolating, the proper angular adjustment of the pinion housing to provide average backlash in the slide drive should be to an angle A of approximately 16½ degrees.

If, in the same example, a minimum backlash without binding is desired, .009 inch would be added to the .0238 inch, which would give a figure of .0247 inch. Referring again to the table, the proper angular adjustment of the pinion housing to provide minimum backlash in the slide drive should be to an angle A of approximately 16 degrees.

The pinion housing 30 is then turned to the proper angular relationship as calculated in terms of angle A or B to give the correct or desired amount of backlash in the drive mechanism, and the securing studs 51 of the securing ring 50 are tightened to fix the pinion housing 30 and the pinion shaft 18 and pinion 17 thereon in the desired adjusted relationship with respect to the rack 16 of the broaching slide 15.

The pinion shaft adjusting pin 55 is now turned out about one-quarter of a turn to prevent binding of the pinion 17 in respect to the rack 16 in the event of any minute mis-alignment of the broaching slide 15, and the said adjusting pin 55 is locked in its final adjusted position by means of the lock nuts 58.

With a rack and pinion slide drive means embodying the improved construction herein disclosed, all unwanted backlash that is possible or practical to be taken up may be eliminated when a machine so equipped is first placed into service. Later, to compensate for increased play in the said drive means occasioned by wearing of mating drive elements, additional adjustments of the backlash may be made, thus assuring that the machine slide operation is smoother and work done thereby is more uniform and accurate than would have been possible had the improved backlash takeup means not been employed.

Although but a single embodiment of the invention has been disclosed and described herein, it is obvious that many changes may be made in the size, shape, arrangement and detail of the various elements of the invention and the application thereof to machine tools, all as defined by the appended claims.

I claim:

1. In a herringbone type rack and pinion drive for the slide of a broaching machine or the like including a frame, a slide reciprocably mounted in ways on said frame, a rack fixed to said slide, a pinion housing turnably mounted in a bore in said frame having an axial center located at the intersection of an axis disposed normal to and an axis spaced parallel from said rack, a pinion shaft, a pinion keyed on said pinion shaft meshed with said rack, said pinion shaft being rotatably mounted in said pinion housing on an axial center eccentric to the axial center of said pinion housing located on said axis spaced parallel to said rack, said pinion housing being cut away at said rack to permit limited turning thereof in respect to said rack, the turning of said pinion housing in opposite directions increasing or decreasing the backlash in said rack and pinion drive, the said pinion housing including an annular flange at one end and a securing ring at the other end thereof including means for fixing said pinion housing in said frame in any position to which it may be turned, and a thrust bearing mounted on said pinion housing axially engaging said pinion shaft adapted to hold the said pinion keyed thereon in central alignment with respect to said rack during said turning of the pinion housing to accomplish the increase or decrease of backlash in said drive.

2. In a rack and pinion drive for the slide of a broaching machine including a frame, a slide reciprocably mounted in ways on said frame, a rack fixed to said slide, a tubular pinion housing turnably mounted in a bore in said frame having an axial center located at the intersection of an axis disposed normal to and an axis parallel from said rack, a pinion shaft, a pinion keyed on said pinion shaft meshed with said rack, bearing means rotatably mounting said pinion shaft in said pinion housing on an axial center eccentric with respect to the axial center of said pinion housing located on said axis spaced parallel to said rack, said tubular pinion housing being cut away at said rack to permit meshing of said pinion with said rack and limited turning of said pinion housing in respect to said rack, the turning of said pinion housing in opposite directions increasing or decreasing the backlash in said rack and pinion drive, the said pinion housing including an annular flange at one end and a securing ring at the other end thereof including means for fixedly clamping said pinion housing in said frame in any position to which it may be turned.

References Cited in the file of this patent

UNITED STATES PATENTS

| | | |
|---|---|---|
| 1,569,862 | La Pointe | Jan. 19, 1926 |
| 2,424,564 | Halbrook | July 29, 1947 |
| 2,444,734 | Gillett | July 6, 1948 |
| 2,533,043 | Price | Dec. 5, 1950 |
| 2,703,497 | Townsend | Mar. 8, 1955 |
| 2,751,822 | Schiltz | June 26, 1956 |

OTHER REFERENCES

"Precision Gearing," by G. W. Michalec, Machine Design, February 1955.